US010086692B2

(12) United States Patent
Marini et al.

(10) Patent No.: US 10,086,692 B2
(45) Date of Patent: Oct. 2, 2018

(54) TANK FILLER NECK

(71) Applicant: Röchling Automotive SE & Co. KG, Mannheim (DE)

(72) Inventors: Luca Marini, Besenello (IT); Matteo D'Amato, Levico Terme (IT)

(73) Assignee: Röchling Automotive SE & Co. KG, Mannheim (DE)

( * ) Notice: Subject to any disclaimer, the term of this patent is extended or adjusted under 35 U.S.C. 154(b) by 209 days.

(21) Appl. No.: 15/051,013

(22) Filed: Feb. 23, 2016

(65) Prior Publication Data

US 2016/0272062 A1    Sep. 22, 2016

(30) Foreign Application Priority Data

Mar. 18, 2015   (DE) .................. 10 2015 204 925

(51) Int. Cl.
  *B60K 15/04*   (2006.01)
  *B60K 15/035*  (2006.01)
  *B60K 15/03*   (2006.01)

(52) U.S. Cl.
  CPC ........ *B60K 15/04* (2013.01); *B60K 15/03519* (2013.01); *B60K 2015/0323* (2013.01);
  (Continued)

(58) Field of Classification Search
  CPC ........ B60K 2015/049; B60K 2015/047; B60K 2015/0458
  (Continued)

(56) References Cited

U.S. PATENT DOCUMENTS 4,651,889 A * 3/1987 Uranishi ................ B60K 15/04
                                                    123/519
4,715,509 A * 12/1987 Ito .......................... B60K 15/04
                                                    141/59
(Continued)

FOREIGN PATENT DOCUMENTS

DE    10 2009 022 587 A1    12/2010
DE    20 2011 105 302 U1    12/2012
(Continued)

OTHER PUBLICATIONS

Espacenet Bibliographic data:DE 20 2011 105 302 (U1), Published Dec. 10, 2012, 3 pgs.
(Continued)

*Primary Examiner* — Anthony Stashick
*Assistant Examiner* — Mollie Impink
(74) *Attorney, Agent, or Firm* — Rankin, Hill & Clark LLP

(57) ABSTRACT

A tank filler neck including a filling line having an insertion end further away from the tank, designed to temporarily insert a breather pipe into the end region of the filling line further away from the tank, a passage line end closer to the tank, designed for passing through liquid in the direction away from the insertion end, a ventilation volume designed for through-flowing gas while passing liquid through the end of the passage line, a ventilation line which ends at a distance from the filling line and which can be blocked or released by a ventilation valve for through-flowing gas, a detecting device designed to detect a passage-ready state and/or a passage state of the filling line, and an operating device designed to adjust, as a function of the detection result of the detecting device, the ventilation valve between the blocking position and the release position.

16 Claims, 2 Drawing Sheets

(52) U.S. Cl.
CPC ............... *B60K 2015/03538* (2013.01); *B60K 2015/03552* (2013.01); *B60K 2015/03595* (2013.01); *B60K 2015/049* (2013.01)

(58) Field of Classification Search
USPC ....................................................... 220/86.2
See application file for complete search history.

(56) References Cited

U.S. PATENT DOCUMENTS

| | | | | |
|---|---|---|---|---|
| 4,719,949 | A * | 1/1988 | Mears ............. | B60K 15/03504 137/587 |
| 5,022,433 | A * | 6/1991 | Jansky ................... | B60K 15/04 137/588 |
| 5,033,517 | A * | 7/1991 | Bucci ..................... | B60K 15/04 141/286 |
| 5,103,877 | A * | 4/1992 | Sherwood ........ | B60K 15/03519 123/519 |
| 6,009,920 | A | 1/2000 | Palvoelgyi et al. | |
| 6,167,920 | B1 * | 1/2001 | Enge ................... | B60K 15/035 141/302 |
| 6,415,827 | B1 | 7/2002 | Harris et al. | |
| 6,708,724 | B2 | 3/2004 | Morinaga | |
| 7,360,565 | B2 | 4/2008 | Peterson et al. | |
| 8,347,914 | B2 | 1/2013 | Runarvot et al. | |

FOREIGN PATENT DOCUMENTS

| | | |
|---|---|---|
| DE | 10 2013 201 237 A1 | 7/2014 |
| DE | 10 2013 103 624 A1 | 10/2014 |
| DE | 20 2013 103 709 U1 | 11/2014 |

OTHER PUBLICATIONS

Espacenet Bibliographic data:DE 10 2013 103 624 (A1), Published Oct. 16, 2014, 4 pgs.
Espacenet Bibliographic data:DE 10 2013 201 237 (A1), Published Jul. 31, 2014, 2 pgs.
Espacenet Bibliographic data:DE 10 2009 022 587 (A1), Published Dec. 2, 2010, 1 pg.
German Search Report for corresponding DE 10 2015 204 925.6 dated Mar. 7, 2016, 9 pgs.
Espacenet Bibliographic data:DE202013103709, Published Nov. 18, 2014, 1 pg.

\* cited by examiner

TANK FILLER NECK

The present invention relates to a tank filler neck, in particular for a motor vehicle, comprising a filling line having an insertion end in the ready-assembled condition further away from the tank, which is designed to temporarily insert a breather pipe into the end region of the filling line further away from the tank, and having a passage line end in the ready-assembled condition closer to the tank, which is designed for passing through a liquid in the direction away from the insertion end, and the tank filler neck furthermore having a ventilation line which is designed for through-flowing gas while passing liquid through the end of the passage line.

BACKGROUND OF THE INVENTION

A generic tank filler neck is known from the publication DE 20 2011 105 302 U1. This printed publication shows a filler neck, the filling line of which provides at the insertion end further away from the tank an annular volume lying radially on the outermost side of the filling line as a ventilation volume, in which gas through-flows, in the counter current to the simultaneously in-filled liquid, the tank filler neck in the direction of the insertion end. In this way, gas displaced by the in-filled liquid may escape through the filling line from the tank typically communicating with the tank filler neck.

During a filling process, the annular ventilation volume lying radially on the outermost side is typically limited radially outwards by the wall of the filling line and radially inwards by a wall of the breather pipe.

The generic solution mentioned above has a ventilation connection protruding laterally from the filling line, which in-feeds gas flowing in the direction of the insertion end only in the region of an outlet end of the breather pipe inserted in the insertion end of the filling line into the volume of the filling line to preferably prevent a collision of the fluids—displaced gas and in-fed liquid—flowing in opposite directions.

A further tank filler neck is known from the publication DE 10 2013 103 624 A1. Here also, a section at the insertion end of the filling line is used to provide the ventilation volume. Again, when the known tank filler neck carries out the filling according to specification, an annular gap between the radially inside situated breather pipe fed into the breather pipe and the radially outside lying wall of the filling line serves as a ventilation volume. In order to ensure a ventilation volume which is as uniform as possible in the circumferential direction around the breather pipe, ribs radially protrude from the inner side of the wall of the filling line serving as radial spacers between the breather pipe and the ventilation volume.

In these known tank filler necks it is disadvantageous that an operator using the tank filler neck according to specifications for filling a tank, who carries out the filling process or at least monitors the process near the tank filler neck, is inevitably bathed by the gas discharging from the insertion end of the filling line, which may at least result in an imposing odor. Depending on the composition of the gas discharging from the filling line, inhaling this gas may, in addition to the mere inconvenience, result also in a health hazard. Furthermore, in the case that the discharging gas is combustible, even an ignition or explosion hazard may result in the region of the insertion end.

A system made up of a tank filler neck, a tank and a ventilation line is known from the DE 10 2009 022 587 A1, in which the ventilation line ends at a distance from the filling line of the tank filler neck; however the solution known from this printed publication does not enable a ventilation of the filler neck itself but merely of the tank connected thereto.

Furthermore, known from the publication DE 10 2013 201 237 A1 is a ventilation valve enabling a ventilation of a fluid line; however, it does not have an insertion end for inserting a breather pipe. Rather, the ventilation valve only comprises a valve chamber having a float valve body movably provided therein and a ventilation opening which is, depending on the position of the float valve body, closed by the float valve body or released by it for through-flowing gas. Thus, the mentioned publication does not disclose a tank filler neck.

SUMMARY OF THE INVENTION

It is an object of the present invention to further develop a generic tank filler neck in such a manner that the disadvantages mentioned above are prevented. In particular, an operator monitoring a filling process at the tank filler neck is not to be bathed by the gases displaced during the filling process.

According to the present invention, this object and others are achieved by a generic tank filler neck as described at the outset having a ventilation line for providing the ventilation volume, which ends at a distance from the filling line for discharging the gas flowing therein and which may be closed off by a ventilation valve or be released for gas to flow through, the ventilation valve for this purpose being adjustable between a blocking position and a release position, and the tank filler neck furthermore having a detecting device which is designed to detect a passage-ready state or a passage state, and furthermore having an operating device which is designed, depending on the detecting results of the detecting device, to adjust the ventilation valve between the blocking position and the release position.

As a result of the tank filler neck having a ventilation line, which is provided in addition to the mentioned filling line, to provide the ventilation volume, the flow of the gas escaping from the tank filler neck or displaced from the tank is in principal decoupled from the flow of the liquid passed through the tank filler neck for filling the tank. Thus, a disruption of the flow of one fluid by the respective other fluid is prevented.

Proving a suitable ventilation line furthermore establishes the prerequisite that the ventilation line is able to discharge the through-flowing gas at a location which is at a distance from the filling line. In this way, it is possible to shield the discharging of gas in the ventilation line from an operator monitoring the filling process and/or to relocate said gaseous discharge to a location which is at a distance from the operator.

Moreover, the also provided ventilation valve may, if applicable, prevent a gas flow through the discharge end of the ventilation line into the atmosphere, as a result of which a person situated near the tank filler neck may be shielded from being bathed by gas from the ventilation line.

In order to ensure an easy operation of the tank filler neck according to specifications, the tank filler neck according to the present invention features the mentioned detecting device to then enable an opening of the ventilation valve for gas to pass-through if this is required as a function of the detected state of the filling line. In this instance, it is particularly provided that the operating device then adjusts the ventilation valve from the blocking position, in which the ventilation line is blocked for a through-flowing of gas, to the release position, in which the ventilation line is released for a through-flowing of gas, when the detecting device detects a passage-ready state and/or a passage state of the filling line.

For this purpose, a passage-ready state is a state in which all prerequisites for passing liquid through the filling pipe in the direction away from the insertion end to the end of the conveying pipe are met; however, no liquid is yet passed through the filling line. A passage state is a state in which liquid, according to specifications, is passed through the filling line in the direction away from the insertion end to the end of the passage line. In this instance, a passage-ready state may, in particular, be a state in which the previously mentioned breather pipe is inserted into the filling line. For this purpose, "breather pipe" refers to any type of line discharging liquid, thus, such as a spigot of a gas pump at a gas station or of another liquid discharge point, a pipe connection of a container, in particular a Kruse bottle, and the like.

In order to impact the components included in the filling process—filling line and breather pipe—as little as possible when detecting the passage-ready state and/or passage state, it is preferred that when the detecting device has a detecting part, which is designed as a proximity sensor to capacitively and/or inductively and/or magnetically and/or optically and/or by ultrasound and/or mechanically detect the passage-ready state and/or the passage state. For this purpose, the detecting device may have respective sensors—in the case of a mechanical detection, for example, a mechanical sensing device, which may be displaced depending on the state to be detected.

The use of a detecting part designed as a proximity sensor thus enables to detect the passage-ready state and/or the passage state of the filling line in a contactless manner or by minimizing physical collisions by detecting a physical approximation in a location in which a part of a delivery device, having the breather pipe and discharging the liquid, is located only when the liquid is passed through the filling line according to specifications. The detecting part for detecting an approximation is to be oriented towards this location. In this instance, it is not to be excluded that detecting a physical approximation may also be triggered by other objects than by parts of the delivery device. According to the further embodiment of the present invention discussed here, a part of the delivery device according to specifications is, by all means, only to be approximated to the preferred location mentioned above when the delivery device having the breather pipe is prepared for the immediate passing through of liquid through the filling line. For example, a component of the delivery device may be fixedly coupled to the breather pipe and then, when the breather pipe is inserted into the filling line, be situated in a defined relative position relative to the filling line. It then may, when detecting the passage-ready state and/or the passage state of the filling line, suffice to detect the approximation of the component to the location of the defined relative position.

In principle, the part of the delivery device monitored in regard to its approximation may be an arbitrary component. Since the passage-ready state and/or the passage state of the filling line is substantially functionally connected to the breather pipe discharging the liquid for passage, the breather pipe is preferably the component of the delivery device monitored in regard to its approximation. Since the breather pipe has to be inserted from the insertion end into the filling line for the passage of liquid, the detecting location for detecting a physical approximation is preferably in the interior of the filling line and, that is, particularly preferably where the breather pipe is located in the passage-ready state and/or the passage state of the filling line.

Since an outlet end pipe of the breather pipe for dispensing liquid is typically inserted into the filling line for passing liquid through the tank filler neck, the component of the delivery device monitored in regard to its approximation is particularly preferably such an outlet end pipe.

Advantageously, the detecting part is designed according to a preferred further embodiment of the present invention as a mechanical proximity sensor so that the detecting part may be displaced between a detecting position, in which it detects the passage-ready state and/or the passage state of the filling line, and a non-detecting position, in which it does not detect a passage-ready state position and/or a passage position of the filling line. Such a mechanical detection of an approximation—even though a physical collision or an abutting engagement is typically required to affect the displacement of the mechanical detecting part—may be carried out in a particularly fast manner and is reliable in its detection result. Moreover, the displacement of the mechanical detecting part may particularly preferably be used not only for detecting the state of the filling line, but also as a motion actuator for adjusting the ventilation valve. In this case, the adjustment of the ventilation valve would result directly after the displacement, detecting the passage-ready state and/or the passage state or may even occur simultaneously with said displacement.

In order to be able to affect the preferred mechanical detection of the approximation of the part of the delivery device in a most reliable manner, an advantageous further embodiment of the present invention provides that the detecting part projects further in the non-detecting position than in the detecting position in the direction of a location in which, when the breather pipe is inserted into the filling line, a part of a delivery device, having the breather pipe and dispensing the liquid, is located. In this manner, the detecting part projecting in the direction of the detecting location may, when creating the passage-ready state, be displaced by the component of the delivery device to be detected, thus, in particular by the outlet end pipe of the breather pipe. To further increase the detection reliability, in particular, after having previously created a passage-ready state or passage state, which intermittently has been cancelled again, the detecting part may preferably be preloaded in the non-detecting position. In this way, it may be achieved that the detecting part is designed in such a manner that it may be displaced by a part of the delivery device, preferably by the breather pipe, particularly preferably by the outlet end pipe of the breather pipe, from the non-detecting position to the detecting position. The arrangement of the intermediate components for adjusting the detecting part from the non-detecting position to the detecting position may thus be omitted; this, in turn, increases the detection reliability and also reduces the installation effort required for manufacturing the tank filler neck according to the present invention.

As already indicated above, it is preferred according to a further embodiment of the present invention that a detection movement of the mechanically detecting part from the non-detecting position to the detecting position serves as a source for actuating an adjusting movement of the ventilation valve at least from the blocking position to the release position. For this purpose, the detecting part may be motion-transmittingly coupled with the ventilation valve in such a manner that a displacement of the detecting part results in at least a partial adjustment, preferably in a complete adjustment of the filling valve from the blocking position to the release position. In this case, no self-contained source of energy has to be provided to affect the adjusting movement of the ventilation valve as a function of the detection results of the detecting device.

Likewise, in the opposite direction of action, it may be considered that the ventilation valve is preloaded in one of its positions, preferably in the blocking position. Furthermore preferred, this preloading of the ventilation valve may also be used for the aforementioned preloading of the detecting part into the non-detecting position. Also in this sense, the ventilation valve and the detecting part may be coupled for a joint movement.

The detection of the passage-ready state and/or the passage state of the filling line does not, however, have to occur mechanically. As mentioned above, this may also be carried out by using other physical operating principles. A particularly reliable adjustment of the ventilation valve by the operating device may then be carried out when it has an electric or electromagnetic actuator for adjusting the ventilation valve. Furthermore, the operating device may have a control device for actuating the actuator. Then, the detecting device may be designed to give out a detection signal as a function of the operating mode of the detecting part in an electric, electromagnetic, optical and/or the like manner, the control device actuating the actuator as a function of the detection signal for adjusting the ventilation valve.

In contrast to the particularly preferable mechanical detection mentioned above, in order to use the detecting part as at least one part of actuating the adjusting movement of the ventilation valve, a separate source of energy is to be provided to actuate the control device and the actuator; however, such an actuator may provide a greater drive power than by only using the mechanically movable detecting part. Moreover, such a separate actuator may, if necessary, also realize more complicated ways of adjusting the ventilation valve, even though such complications are not preferred.

The ventilation line may also be provided to ventilate the filling line itself. For this purpose, it may be provided that the ventilation line has a connection to the filling line upstream of the ventilation line to ventilate said filling line. In this instance, "upstream" relates to the gas flow in the ventilation line, not to the liquid flow in the filling line.

Additionally or alternatively, the ventilation line may be set up or designed for ventilating a tank attached to the tank filler neck. For this purpose, the ventilation line may be attachable or attached to a tank. For this reason, the present invention also relates to a tank filler neck as described above having this tank for in-feeding liquid. The ventilation line may, in particular, branch out so that from the tank ventilation line, which runs between the tank and the outlet end of the ventilation line, a secondary ventilation line may run to the filling line.

In order to provide a tank filler neck as compact as possible, which takes up little construction space, it may be provided that the ventilation line has a ventilation chamber which radially surrounds the filling line on the outside and which is penetrated by said filling line. This ventilation chamber may, for example, have a first connection for attaching to the tank and a second connection for attaching to the filling line so that a flow-mechanical union of the tank ventilation line and the secondary ventilation line may occur in the ventilation chamber. This significantly simplifies the architecture of the ventilation line, as a line branching between the tank ventilation line and the secondary ventilation line may be omitted.

The present invention relates, moreover, to a motor vehicle having, as described above, an embodied tank filler neck. Moreover, the motor vehicle may have a tank which flow-mechanically communicates with the tank filler neck.

The preferred, compact embodiment of a tank filler neck described above could, in principle, counteract the effort to situate the discharging end of the ventilation line at a distance from the insertion end of the filling line. In this instance, a portion of the vehicle itself may however be used for shielding the discharging end of the ventilation line from the operator monitoring a filling process through the filling line. For example, the tank filler neck may be situated at the motor vehicle in such a manner that a portion of the motor vehicle, for example, a portion of the vehicle body is positioned between the operator monitoring the filling process and the discharging end of the ventilation line. The operator is located outside of the vehicle while monitoring the filling process.

A portion of the vehicle body is preferred to shield the discharging end of the ventilation line because the vehicle body typically is a flat, thin structure which is able to cover a relatively large area above and next to the discharging end of the ventilation line on the one hand and in which, owing to the low thickness of the body, the discharging end alongside the filling line has to be situated only slightly behind its insertion end.

In the here proposed preferred solution at the motor vehicle, gas emitted from the ventilation line is discharged into a volume within the motor vehicle body and, thus, does not reach or reaches very, very slowly the area outside of the body where the operator monitoring the filling process is located. The gas discharged within the body typically takes substantially longer to reach the place where the operator is located than the duration of the filling process. After the filling process is completed, the operator typically removes himself/herself from the tank filler neck and either leaves the vehicle or gets into the vehicle and starts the driving operation. In either case, the operator is not inconvenienced by the gas discharged from the ventilation line.

The volume into which the gas flowing through the ventilation line is discharged, is thus advantageously located not only within the vehicle body, but at the same time is outside of the vehicle cabin. During driving the motor vehicle, the airstream dissipates the gas located in this volume.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
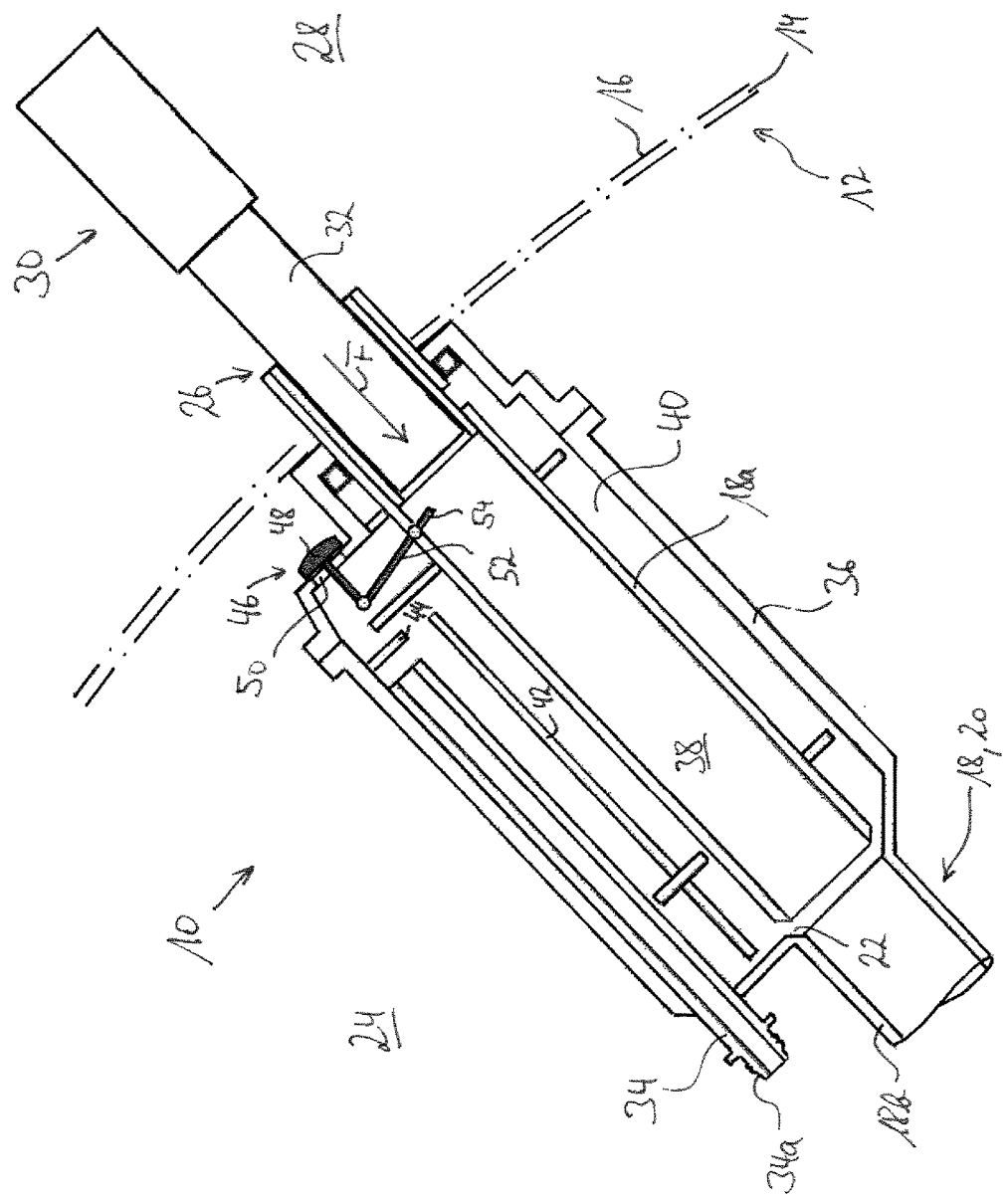
FIG. 1 shows a roughly schematic longitudinal section of an exemplary embodiment of a tank filler neck shortly before establishing a passage-ready state.

Referring now to the drawings wherein the showings are for the purpose of illustrating preferred and alternative embodiments of the invention only and not for the purpose of limiting the same, FIG. 1 shows a tank filler neck shown only roughly schematically in a longitudinal section is generally referenced by the reference character 10. Tank filler neck 10 is provided at a motor vehicle 12, of which FIGS. 1 and 2 only show a dash-dot line of an auto body 14 showing a cross-sectional profile of a body sheet-metal 16 in the drawing plane of FIG. 1.

Tank filler neck 10 comprises a fill hose 18 defining a filling line 20. Fill hose 18 shown in the example is advantageously formed by a plurality of parts and has, for example, an upper fill hose 18a and a lower fill hose 18b thereto attached. A gap 22 is formed between upper fill hose 18a and lower fill hose 18b, which will be described in more detail further below and which serves to ventilate filling line 20.

Lower fill hose 18b is located in vehicle interior 24 of body 16. An insertion end 26 of fill hose 18, more specifically, of upper fill hose 18a, projects through body 16 to vehicle outside 28 of body 16.

Furthermore, FIG. 1 shows a section of a breather pipe 30, the outlet end pipe 32 of which is partially inserted through insertion end 26 into fil hose line 20. Breather pipe 30 serves as an end-sided part of a delivery device, which is not shown in FIGS. 1 and 2, for discharging a liquid along arrow F.

Figure 2:
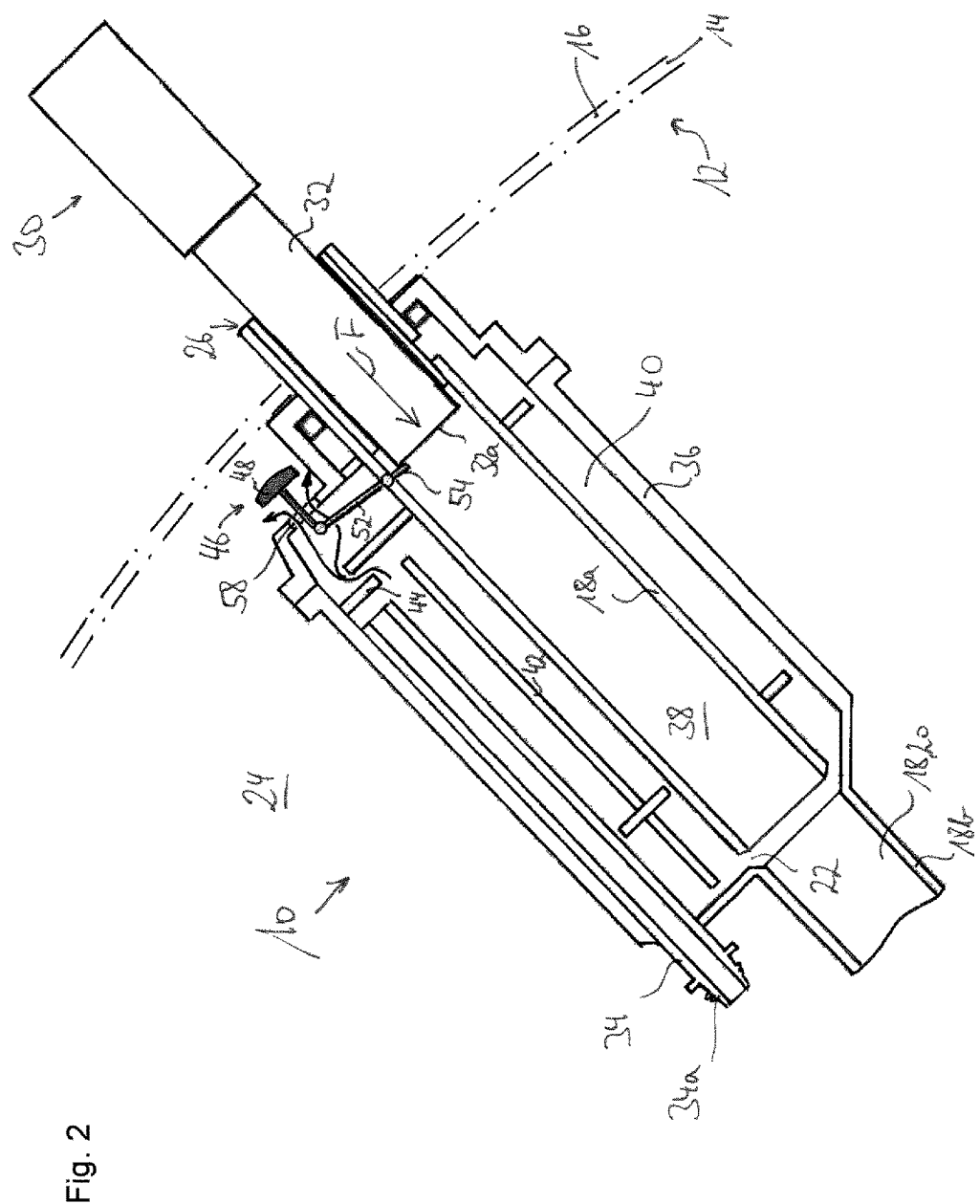
FIG. 2 shows the roughly schematic longitudinal section from FIG. 1 having an established passage-ready state.

The passage end, which is no longer shown in FIGS. 1 and 2, is located at the longitudinal end of filling line 20 opposite of insertion end 26. For this reason, liquid discharged by breather pipe 30 flows away from insertion end 26 in the direction of and through the passage end through tank filler neck 10.

Tank filler neck 10 has a ventilation line part 34 which, in the shown example, is formed for the most part separate from filling line 20. Ventilation line part 34 of tank filler neck 10 terminates in a coupling end 34a to which a further line component, for example, in form of a hose, may be attached. A hose thereto connected is, after flow-technically connecting with coupling end 34a, also part of ventilation line part 34. Preferably rigid ventilation line part 34 provided at tank filler neck 10 may, by using or interpositioning a hose, be flexibly connected to a plurality of different tank containers and a plurality of different connection points at the respective tank container.

Ventilation line part 34 ends in a ventilation chamber 36 which likewise is part of the ventilation line also formed by ventilation line part 34. Interior 38 of filling line 20 also communicates, through the previously mentioned gap 22, between the upper fill hose 18a and the lower fill hose 18b with filling line 20 of the ventilation line, more specifically, with ventilation chamber 36 as a section of said ventilation line.

Thus, gas from filling line 20 and gas from the ventilation line formed by incorporating ventilation line part 34 mix in interior volume 40 of ventilation chamber 36.

Namely, if liquid is in-fed through tank filler neck 10, more specifically through filling line 20, in the direction away from insertion end 26 through the not shown passage end into an also not shown tank container, gas which first was located in filling line 20 and in the tank container, is displaced by this in-fed liquid. This gas may escape on the one hand through a tank ventilation line from the tank container. This tank ventilation line is formed by participation of ventilation line part 34 and of a non-shown hose, if applicable, coupled to said ventilation line part.

Likewise, the gas may escape from filling line 20 through gap 22 into interior volume 40 of ventilation chamber 36.

Only for purposes of completion, it shall be mentioned that interior volume 40 of ventilation chamber 36 may have an interior structure, for example, bracing 42 or impact plate 44 to stiffen interior volume 40 or to cut off liquid which unwantedly is carried along by the gas flowing in the ventilation line.

The ventilation line, of which FIGS. 1 and 2 only show the sections annular gap 22, ventilation line part 34 and ventilation chamber 26, has furthermore a ventilation valve 46, which may have a valve body 48 closing off, in its blocking position shown in FIG. 1, a ventilation opening and, for this reason, a discharging end 50 of the ventilation line and, which thus blocks a through-flowing of gas.

An operating device 52, for example, in form of a mechanical rod, may be provided to completely adjust ventilation body 48 and, for this reason, ventilation valve 46 from its blocking position shown in FIG. 1 to the release position shown in FIG. 2, in which ventilation valve 46 enables gas to flow through discharging end 50 of the ventilation line.

In a particularly simple but advantageously effective exemplary embodiment, a part of the operating device may be designed as detecting device 54, for example, as a mechanical sensing device projecting into the interior 38 of filling line 20.

More specifically, mechanical sensing device 54 projects at a preferred detecting location into interior 38 of filling line 20, which in a passage-ready state and/or a passage state is reached by a part of breather pipe 30, more specifically, by outlet end pipe 32.

FIG. 2 shows tank filler neck 10 together with breather pipe 30 in a passage-ready state, in which breather pipe 30 has reached its maximum insertion depth into filling line 20.

In this instance, longitudinal end 32a of outlet end pipe 32 of breather pipe 30 having the outlet opening has entered an abutting engagement with mechanical sensing device 54 and has displaced said mechanical sensing device in line with filling line 20 in the direction of insertion (which is equal to liquid flow direction F) of breather pipe 30 into filling line 20. Since mechanical sensing device 54 is integrally formed with operating device 52, this displacement of mechanical sensing device 54 has caused ventilation valve 46 to adjust into the release position shown in FIG. 2. A separate energy source for adjusting ventilation valve 46 between its release position and its blocking position may, for this reason, be omitted. Preferably, ventilation valve 46 is preloaded into its blocking position shown in FIG. 1 so that after removing breather pipe 30 from filling line 20, ventilation valve 46 returns to its blocking position and, thus, mechanical sensing device 54 returns to its detecting position, in which it is ready to achieve again a maximum insertion depth of breather pipe 30 into filling line 20, and, in this way, to detect the establishment of a passage-ready state.

The position or state shown in FIG. 2 enables to directly discharge liquid from breather pipe 30 into filling line 20.

Preferably, discharging end 58 of the ventilation line is located in the longitudinal direction of filling line 20 offset from insertion end 26 in the direction of the passage end so that space is available between discharging end 58 of the ventilation line and insertion end 26 of filling line 20 to position flat body 16 between the two ends. In this way, it is possible to let gas flowing in the ventilation line discharge into an interior area 24 enclosed by vehicle body 16, while an operator executing the filling process or at least monitoring the filling process stays outside of vehicle body 16 in outer area 28 of the vehicle. In this way, effective and simple means may shield the operator for the duration of the filling process from the gases displaced by the filling process. The gases discharging from discharging end 58 sooner or later reach, owing to diffusion, also vehicle exterior 28; however, this may be expected to occur only at a point in time when the filling process has been completed. By that time, the operator will have left the location near insertion end 26 of filling line 20.

Alternatively, discharging end 58 may be also positioned in the longitudinal direction of the filling line at the same height as insertion end 26 or even on the other side of said insertion end. This is approximately then possible when insertion end 26 is located in a specifically designed recess for vehicle body 16, as it is known for tank filler necks for filling the fuel tank of a motor vehicle. Discharging end 58 of the ventilation line may then lie apart from the recess on the other side of insertion end 26.

The direct actuation of ventilation valve 46 by a part of the liquid delivery device—here, through outlet end pipe 32 of breather pipe 30—it is ensured that only during the filling process ventilation is possible and that at all other times a hermetically sealed tank and tank filler neck system is provided.

Instead of illustrated mechanical sensing device 54, the passage-ready state and/or the passage state may also be detected by sensors on the basis of other physical mechanisms of action, and then the detected state may in principle be transmitted by the transmission of an electrical signal to a control device. The then provided control device may interact with an actuator of the operating device which actuates a sensor detecting the passage-ready state and/or the passage state from the control device as a function of the transmitted detection signal for adjusting ventilation valve 46.

The interaction of the detecting device, which detects the passage-ready state and/or the passage state of tank filler neck 10, and the operating device, which is designed to adjust ventilation valve 46 between the blocking position and the release position, may always ensure that the leak tightness of the tank and tank filler neck system with participation of the tank filler neck according to the present invention may be disrupted by opening discharging end 58 only when tank filler neck 10 is directly prepared for passing through liquid or when liquid is passed through said tank filler neck.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

What is claimed is:

1. A tank filler neck for a motor vehicle, the tank filler neck comprising a fill hose defining a filling line having an insertion end in a ready-assembled condition further away from an associated tank, the filling line having a passage end in the ready-assembled condition closer to the tank, which is designed for passing through liquid away from the insertion end, said fill hose comprising an upper fill hose, which includes the insertion end, and, at a location away from the insertion end, a lower fill hose attached relative to the upper fill hose with a gap formed in between the upper and the lower fill hoses, wherein the tank filler neck furthermore has a ventilation volume which is designed for through-flowing gas while passing liquid through the passage end, the tank filler neck has, for providing the ventilation volume, a ventilation line for discharging gas ending at a distance to the filling line and which can be blocked or released for through-flowing gas by a ventilation valve wherein the ventilation valve is adjustable between a blocking position and a release position and wherein the tank filler neck furthermore has a detecting device which is designed to detect a passage-ready state and/or a passage state of the filling line, and, furthermore, has an operating device which is designed to adjust, as a function of the detection result of the detecting device, the ventilation valve between the blocking position and the release position, wherein the ventilation line has a ventilation chamber surrounding the filling line on the radial outside and penetrated by the filling line, wherein the upper fill hose, over its entire length, separates the ventilation volume from the filling line with the gap opening into the ventilation volume, wherein the ventilation valve is provided to open and close off a ventilation opening through which gas can be discharged from the ventilation chamber.

2. The tank filler neck according to claim 1, wherein the detecting device comprises a detecting part, which is designed as a proximity sensor, to capacitively and/or inductively and/or magnetically and/or optically and/or by ultrasound and/or mechanically detect a passage-ready state and/or a passage state of the filling line.

3. The tank filler neck according to claim 2, wherein the detecting part detects the passage-ready state and/or the passage state of the filling line by detecting a physical approximation of an associated delivery device in a location at which the associated delivery device is located only when liquid is passed through the filling line according to the intended use of the filling line.

4. The tank filler neck according to claim 3, wherein the detecting location is located in an interior of the filling line.

5. The tank filler neck according to claim 3, wherein the detecting part is displaceable between a detecting position, in which it detects the passage-ready state and/or the passage state of the filling line, and a non-detecting position, in which it does not detect a passage-ready state and/or a passage state.

6. The tank filler neck according to claim 5, wherein the detecting part in the non-detecting position projects further into the interior of the filling line than in the detecting position, and wherein the detecting part is preloaded in the non-detecting position.

7. The tank filler neck according to claim 5, wherein the detecting part is designed to be displaced by a part of the associated delivery device from the non-detecting position to the detecting position.

8. The tank filler neck according to claim 7, wherein the detecting part is designed to be displaced by an outlet end of the associated delivery device from the non-detecting position to the detecting position.

9. The tank filler neck according to claim 5, wherein the detecting part is motion-transmittingly coupled with the ventilation valve in such a manner that a displacement of the detecting part results in at least a partial adjustment of the ventilation valve from the blocking position into the release position.

10. The tank filler neck according to claim 9, wherein the displacement of the detecting part results in a complete adjustment of the ventilation valve from the blocking position into the release position.

11. The tank filler neck according to claim 2, further comprising a control device for adjusting the ventilation valve, an actuator which can electrically or electromagnetically be actuated by the control device, wherein the detecting device issues a detection signal as a function of an operating condition of the detecting part and the control device actuates the actuator as a function of the detection signal for adjusting the ventilation valve.

12. The tank filler neck according to claim 1, wherein the ventilation line has a connection to the filling line upstream of the ventilation valve.

13. The tank filler neck according to claim 1, wherein the ventilation line is connectable to the associated tank.

14. A motor vehicle having a tank filler neck according to claim 1, wherein a discharge opening of the ventilation line, through which the ventilation line discharges gas flowing through it into the atmosphere, is covered by a portion of the motor vehicle.

15. The motor vehicle according to claim 14, wherein the discharge opening is covered by a body component of the motor vehicle when viewing the motor vehicle from the outside.

16. The tank filler neck according to claim 1, wherein the detecting device comprises a detecting part within an interior of the upper fill hose and the remaining portions of the detecting part being outside of the upper fill hose.

* * * * *